April 30, 1940. P. L. J. B. LAMBERT 2,198,731
STEERING WHEEL
Filed April 7, 1937 2 Sheets-Sheet 1
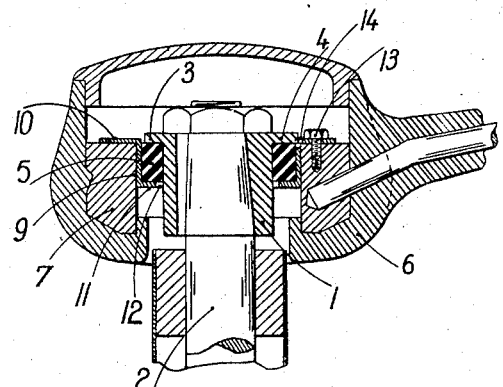
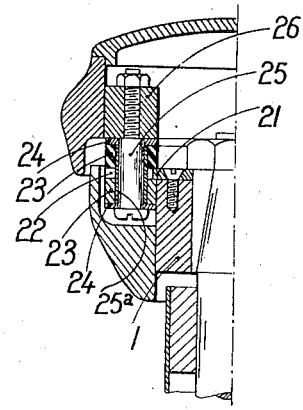
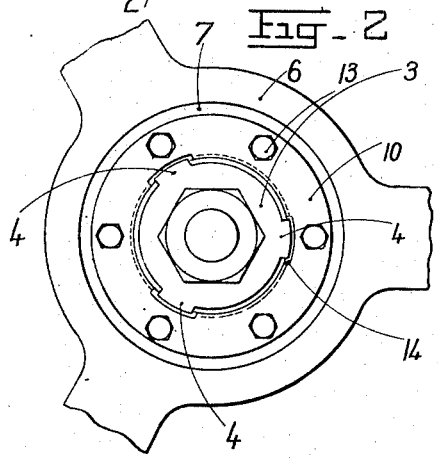
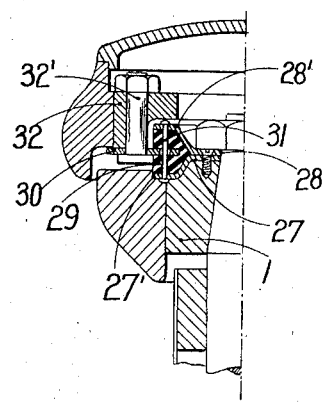
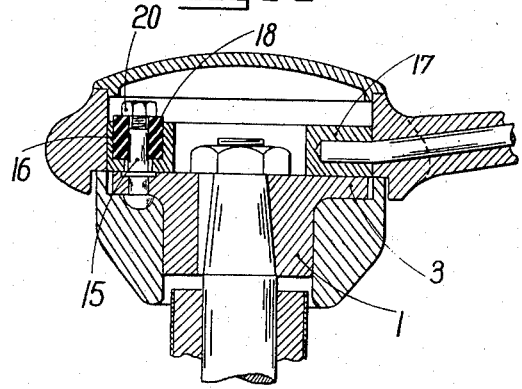
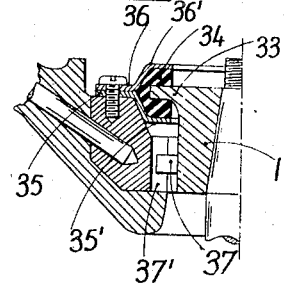
P. L. J. B. Lambert
Inventor
By Glascock Downing & Seebold
Attys.

April 30, 1940.　　　P. L. J. B. LAMBERT　　　2,198,731
STEERING WHEEL
Filed April 7, 1937　　　2 Sheets-Sheet 2
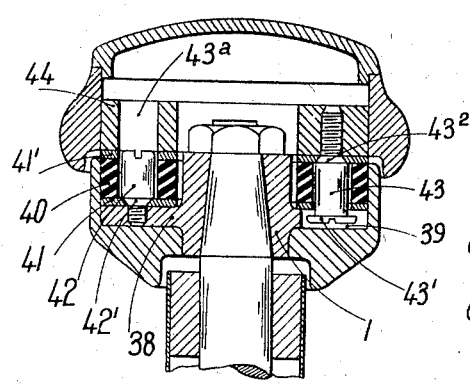
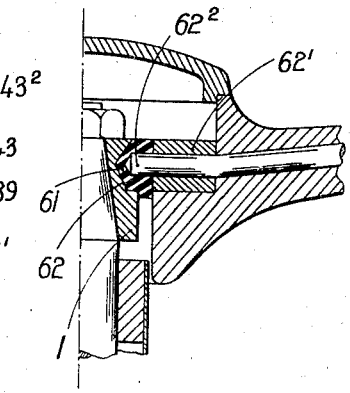
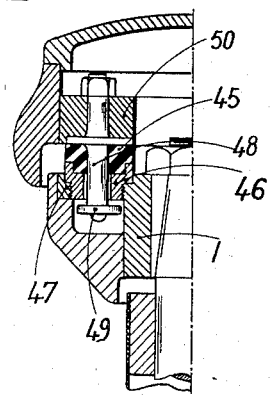
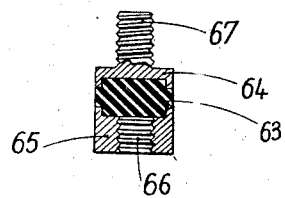
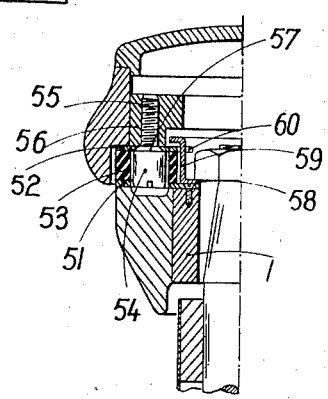
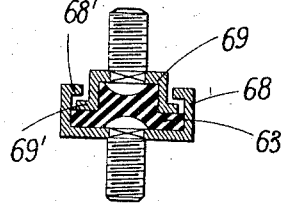

Patented Apr. 30, 1940

2,198,731

UNITED STATES PATENT OFFICE 2,198,731

STEERING WHEEL

Pierre Louis Jean Baptiste Lambert, Paris, France, assignor to the Society: Compagnie Franco-Americaine des Jantes en Bois, Paris, France, a corporation of France Application April 7, 1937, Serial No. 135,565

6 Claims. (Cl. 74—552)

The present invention relates to improvements in steering wheels, whether these be cast or not. It chiefly concerns steering wheels in which the assemblage consisting of the rim and the spokes is connected in an elastic manner with a hub which is mounted on the steering column, or directly with this latter, for the purpose of eliminating the reactions on the steering wheel and to render this latter much easier to handle.

In one form of construction, the steering wheel is connected with a hub which is secured for instance by a tapered part and a key to the rod of the steering column, through the medium of a ring consisting of rubber or like yielding material, which is preliminarily cemented to the periphery of the hub.

The hub is provided at its end with a flange carrying on its periphery three tongues adapted for insertion into the corresponding notches of a concave member whose upper edge, in which the said notches are formed, is secured by screws to the body of the steering wheel, whilst the lower edge forming the bottom of the concave member provides for the maintenance of the yielding member thus interposed. The rubber or like yielding material is preferably cemented to the said concave member, but it may also be mounted in compression, and thus the inner edge or bottom of the concave member will compress the yielding material against the shoulder of the hub and will act by compression in the vertical direction.

The bottom of the concave member has a central aperture for the engagement of the hub upon the steering rod, with a certain play.

In another form of construction, the hub is provided at the top with a flange which bears against the central body of the steering wheel and in which are mounted riveted stud-bolts in the vertical position, adapted for free insertion into recesses which are formed in the hub of the steering wheel and which receive the ends of the metallic stiffening of the spokes. Into these recesses are inserted masses of rubber or like yielding material, which are fitted upon the stud-bolts and are held in position by nuts.

In another form of construction, the hub is secured to the steering wheel by a set of washers, the central washer being secured to the hub by screws or by like means. Masses of rubber are cemented to the same and also to washers placed in either side. The device thus formed is traversed by rods whose threaded ends are either mounted in a ring secured to the steering wheel and held by nuts, or screwed directly into the ring, in such way as to press the outer washers against this latter, by the use of a tubular connecting member.

Other forms of construction will be more particularly set forth in the following description with reference to the accompanying drawings.

Fig. 1 is a cross-section of a steering wheel which is connected in an elastic manner to the hub by a ring consisting of rubber or like yielding material, which is inserted or cemented between the hub and the body of the steering wheel by means of a metallic concave member.

Fig. 2 is a corresponding plan view.

Fig. 3 is a cross-section of a modified device in which the elastic connection is made by means of stud-bolts which are secured to the hub and pass through rubber masses engaged in recesses formed in a member secured to the steering wheel.

Fig. 4 shows a modification in which the steering wheel is connected with the hub by a washer or flange cemented at the same time to washers placed on either side, the whole device being secured to the steering wheel by screws.

Fig. 5 shows a modification in which the elastic device is inserted or cemented between discs secured to the hub, and a disc secured to the steering wheel.

Fig. 6 relates to a modification in which the elastic device is inserted between discs mounted on the steering wheel and a flange provided on the hub.

Fig. 7 shows a modification in which the elastic device consists of a ring cemented between two metallic washers, whereof one is secured to the steering wheel and the other is secured to the hub, allowing play which is limited in all directions.

Fig. 8 relates to a modification in which the elastic device is secured to a socket which is screwed to the hub and is connected with the steering wheel by a threaded rod.

Fig. 9 shows a modification in which the elastic device is cemented to two discs which are secured respectively to the hub and the steering wheel, and are connected together for safety purposes in order to limit the play, by a system of tongues and notches.

Fig. 10 indicates an elastic device formed by the yielding material which is incorporated by casting, either after or during the casting of the steering wheel.

Figs. 11 and 12 show details of construction.

In the embodiment shown in Figs. 1 and 2, the steering wheel, which is moulded, for example, is secured to the hub 1 which is mounted for instance by a tapered part and key, and held by a nut, upon the rod 2 of the steering column, in the following manner.

The hub has at its upper part a flange 3 carrying at its periphery the tongues 4, which are spaced at 120° for example. Upon the hub is mounted a ring 5 of rubber or other yielding material, which is cemented in a concave metallic member 9 and bears against and is cemented to the lower side of the flange 3.

In the central space of the core 7 of the handwheel is engaged the metallic member 9, whose large flange 10 rests upon the upper face of the said core, whilst the bottom part 11 has a central orifice 12 giving passage to the hub 1, with an appreciable play. The concave member 9 is secured to the hub 7 by screws 13, and it carries, adjacent the tongues 4, the notches 14 having a greater width than the tongues. The rubber ring 5 is thus held between the bottom part 11 of the concave member 9 and the flange 3 of the hub, in such way as to afford safety in case the adhesion to the hub should fail.

By means of the tongues 4 of the hub 1, the angular elasticity is limited, as in either direction of rotation of the wheel, one or the other face of the notches will make contact with the corresponding face of the adjacent tongues, through the medium of a rubber cushion which has entered the spaces left for the play, in the course of molding.

This forms, in a very simple manner, an elastic connection between the wheel and its hub.

In the modification shown in Fig. 3, the hub 1, as before, has a large flange 3 at the upper part, in which are secured the stud-bolts 15 which are suitably maintained and which extend freely into recesses 16 formed in a ring 17 secured to the wheel. Into the said recesses are inserted the masses 18 of rubber or other yielding material, which are consequently engaged upon the said stud-bolts and are held by nuts 20. In this case, as before, the elasticity is limited in either direction of rotation.

In the embodiment shown in Fig. 4, the elastic connection is obtained in the following manner.

To the hub 1 is secured, in any suitable manner, a washer 21, which might even be formed by a flange of the hub; this washer or flange has notches 22 adapted to limit the angular movement by their contact with tubes 25ª. On either side of the washer or flange are cemented end rings 23 of rubber or other yielding material, which are cemented to metallic discs or washers 24 located on the respective sides of the central washer. Through the rings 23 are inserted the tubular connecting members 25ª which also enter the notches 22 and bear against the outer washers 24. The said tubular members are traversed by stud bolts 25 whose threaded end is screwed into the ring 26 which is secured to the wheel, and to which said stud bolts are secured by nuts. The stud bolts 25 thus provide for the pressing of the washers 24 against the ring 26, owing to the tubular members 25ª.

The washer 21, which is secured to the hub 1, is thus connected in an elastic manner by the rings 23 mounted on the hand-wheel.

In the device shown in Fig. 5, the hub 1 is provided at its upper part with two discs 27—28 whose edges 27¹—28¹ are spaced apart in order to form an annular cavity in which is cast cemented rubber or other plastic material 29. In the body of the rubber is engaged and cemented the inner edge of a metallic disc 30 traversed, with a certain play, by rods 31 in suitable number, which are riveted to the edges 27¹—28¹ of the discs. The disc 30 is held upon the body 32 of the wheel by bolts 32¹.

Fig. 6 shows a modification of Fig. 5, in which the metallic hub 1 comprises a flange 33, engaged in a mass of rubber 34 which is moulded and cemented between the separated edges 35¹—36¹ of the metallic discs 35—36 secured to the body of the wheel. The angular movement is limited by stops 37 mounted on the hub and engaged in grooves 37¹ formed in the body of the wheel.

In the device shown in Fig. 7, the hub 1 comprises a flange 38 having radial notches 39 alternating with solid parts. On the solid parts of the said flange are cemented rubber rings 40 which are cemented to two metallic discs 41—41¹. The hub 1 is then secured to the steering wheel by stud-bolts 42—43, a certain number of which, 42, are screwed into the solid parts of the flange 38, passing freely through apertures 43ª formed in the body 44 of the wheel, and the others, 43, are screwed into the body 44 of the wheel, passing through the notches 39 of the flange 38, thus securing the washer 41 to the hub, and the washer 41¹ to the wheel, the vertical play being limited by the head 43¹ of the stud-bolt 43.

The rings 40 are secured to the wheel and the hub by parts which have for instance a conical shape, 42¹—43² which bear upon apertures of like shape, formed in the metallic discs 41—41¹.

The stud-bolts 42—43, being in alternate disposition on the periphery of the body of the wheel and of the flange of the hub, thus assure absolute safety.

In the modification shown in Fig. 8, the elastic member 45 is cemented into a socket 46 which is screwed into the flange 47 of the hub 1. Into the elastic mass is inserted a stud bolt 48 which passes freely through the said socket, in which it is held, with a certain play, by a head 49. The other end of the stud bolt 48 passes through the body 50 of the steering wheel, and it is held upon this body by a nut.

In the construction shown in Fig. 9, the elastic device consists of two metallic discs 51 and 52 between which is cemented a rubber ring 53 having an orifice for the insertion (with play) of the cylindrical head 54 of a threaded stud bolt 55 which is screwed into the body 56 of the wheel. The head 54 may have a tapered part 57 in contact with a part having the same form, pertaining to the disc 52. The disc 51 is secured to the hub 1, and to this latter is secured, by a nut, another disc 58 provided with vertical tongues 59 adapted to fit into grooves 60 formed in the disc 52, thus holding the parts together in the vertical direction. The parts are held together in the angular direction by the play provided between the head 54 and the corresponding opening formed in the washer 51. It is obvious that the difference in diameter between the threaded rod 55 and the head 54 might be obtained by means of a shoulder instead of a tapered part 57, as shown in the figure.

In the device shown in Fig. 10, the elastic connection is ensured by means of a yielding material 61 which is incorporated during, or after, the moulding of the steering wheel. The yielding material thus forms a ring cemented to both the hub and core which is concentric with the hub, and fills up the space due to the difference in the diameter between the hub and the core 62¹. The studs 62² which are separately secured or consist of extended parts of the arms of the framework, enter recesses 62 which are formed in line with the said studs. The space between the said recesses and the studs becomes filled with rubber, and thus provides for an elasticity in all directions, which is thus limited as to safety.

Figs. 11 and 12 show forms of construction of driving devices provided with elastic means which may be interposed between the hub and the body of the steering wheel.

In Fig. 11, the mass of rubber or other yielding material 63 is cemented in two concave members 64—65 which are superposed and in the contrary position; one member is extended by a male part consisting of a threaded rod 67, and the other is provided with a female part consisting of a tapped recess 66. It is evident that each of the said concave members might be provided with a male or a female part.

In Fig. 12, the mass of rubber or other yielding material 63 is cast into two concave members and cemented to same. These members consist of stamped or turned sheet metal, one of which, 69, is engaged in the interior of the member 68, and is terminated by a flange 69¹ which extends outwardly and bears against the mass 63, leaving a certain play between its periphery and the member 68.

After casting the mass 63, the flange 68¹ of the member 68 is bent over towards the interior in order to cover the flange 69¹, while leaving a certain play between the two flanges, and also between the flange 68¹ and the member 69, thus preventing any improper separation between the two concave members. This will afford the greatest safety. Each concave member is secured to a male or a female part adapted to be inserted into the corresponding part or to receive this latter, such parts being provided on the hub and the body of the steering wheel.

In view of the preceding, it will be observed that the elastic connection between the hub and the body of the steering wheel may be made either by an annular assemblage consisting of the yielding material which is preliminarily cemented to discs or rings secured respectively to the hub or the steering wheel or by a determined number of elastic masses inserted between washers.

The constructions described and represented are given only by way of example, and are not of a limitative nature, and these are susceptible of modifications in detail without departing from the principle of the invention.

I claim:

1. A steering wheel for driving a steering column, comprising a hub rigidly secured to said column and having a horizontal flange with projecting tongues, a wheel body having a core with a central space, a member secured to said core and having notches for engaging with play said tongues, a bottom flange on said member below said hub flange, and a yielding member interposed between said hub and bottom flange and cemented thereto.

2. A steering wheel for driving a steering column, comprising a hub rigidly secured to said column, a wheel body having a core with a central space, a washer secured to said hub and extending radially outwardly from the latter, the outer edge of said washer being provided with a series of notches, a pair of annular yielding members on each side of said washer, the washer engaging face of each of said yielding members being cemented to said washer, a pair of axially spaced discs cemented to the opposite faces of said yielding members, vertical sleeves extending through said notches and annular yielding members and interposed between said discs, and means extending through said sleeves and secured to said core for compressing said yielding members against said discs, the diameter of said sleeves being less than the width of said notches for limiting the circumferential movement of said wheel body with respect to said hub.

3. A steering wheel for driving a steering column, comprising a hub rigidly secured to said column, a wheel body having a core with a central space, a pair of metal discs secured to said hub, the outer edges of said discs being spaced apart to form an annular chamber, yielding means in said annular chamber cemented to said discs, an annular metal disc secured to said core and having its inner edge inserted into and cemented to said yielding means, for yieldably connecting said wheel body to said steering column in such a manner as to work by shear when said wheel body is rotated about the axis of said steering column, the inner edge of said annular disc being provided with a series of apertures, the outer edges of said first named metal discs being provided with a complementary series of apertures, and rods extending through said apertures for limiting the circumferential movement of said wheel body with respect to said hub.

4. A steering wheel for driving a steering column, comprising a hub member rigidly secured to said column, a wheel body having a core member with a central space, a pair of metal discs secured to one of said members, the outer edges of said discs being spaced apart to form an annular chamber, yielding means in said annular chamber cemented to said discs, annular means secured to the other of said members and having its inner edge inserted into and cemented to said yielding means for yieldably connecting said wheel body to said steering column in such a manner as to work by shear when said wheel body is rotated about the axis of said steering column, and means for limiting the circumferential movement of said wheel body with respect to said hub.

5. A steering wheel as claimed in claim 4 wherein said last named means comprises a series of rods fixed to said pair of metal discs and extending vertically through apertures in said annular means.

6. A steering wheel for driving a steering column of a self-propelled vehicle, comprising a hub secured to the upper end of said column, a wheel body with a central core, annular flange means carried by said hub, complementary annular means carried by said core and axially spaced from said flange means, annular elastic means inserted between said annular flange means and said complementary annular means and cemented to both of said means for yieldably connecting said hub to said core in such a manner as to work by shear when said wheel body is rotated about the axis of said steering column, and means for limiting the circumferential movement of said wheel body with respect to said hub.

PIERRE LOUIS JEAN BAPTISTE LAMBERT.